United States Patent Office 3,108,927
Patented Oct. 29, 1963

3,108,927
PHENOLIC PESTICIDE
William J. Pyne, Painesville, Ohio, assignor to Diamond Alkali Company, Cleveland, Ohio, a corporation of Delaware
No Drawing. Filed Sept. 2, 1958, Ser. No. 758,607
2 Claims. (Cl. 167—31)

This invention relates to new and improved biologically active compositions and their application as biologically active materials, especially as plant growth regulants.

This is a continuation-in-part of my application Ser. No. 596,817, filed July 10, 1956, now U.S. Patent 3,052,-601.

In the many and diverse applications wherein biologically active materials are used, the limitations imposed by the specific use contemplated and/or the compounds heretofore known to exhibit the desired activity have, in many instances, severely restricted the use of such materials and added impetus to the search for new and improved materials.

A particular area in which prior art materials have not been completely satisfactory is in the field of plant growth regulants. Accordingly, here too, the search has continued for new and improved plant growth regulants for such applications as fungicides, herbicides, nematocides, and the like, as well as insecticides.

It is, therefore, a principal object of this invention to provide new and improved biologically active compositions.

It is a further object of the invention to provide new and improved plant growth regulant compositions and method of controlling plant growth.

Other objects and advantages of the invention will appear more fully from the following description thereof.

The present invention contemplates a biologically active composition containing as an essential active ingredient present in an amount sufficient to exert biological activity in use, a compound of the formula

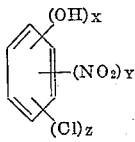

wherein X is 1 or 2, Y is 1 or 2, and Z is a number from 1 to 6—X—Y, any free bonds being satisfied by hydrogen. Thus, it will be appreciated that compounds of this invention may be termed chlorinated nitrophenols such as polychloronitrophenols, including polychlorodinitrophenols or polychloromononitrophenols. More specifically, illustrative compounds include tetrachloronitrophenols, trichloromononitrophenols, such as 2,4,5-trichloro-6-nitrophenol and 2,4,6-trichloro-5-nitrophenol, trichlorodinitrophenols, dichloromononitrophenols, such as 2,3-dichloro-4-nitrophenol, 2,5-dichloro-6-nitrophenol and 2,4-dichloro-5-nitrophenol, dichlorodinitrophenols, monochloromononitrophenols, monochlorodinitrophenols and diphenol derivatives of the foregoing types.

Structures of illustrative compounds of the above types are:

2,5-dichloro-4,6-dinitrophenol, M.P. 146–7° C.

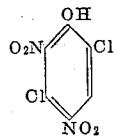

2,4-dichloro-5-nitrophenol, M.P. 103–5° C.

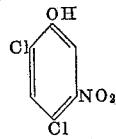

3,6-dichloro-2-nitrophenol, M.P. 68–69° C.

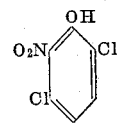

6-chloro-2,4-dinitro-1,3-resorcinol, M.P. 91–2° C.

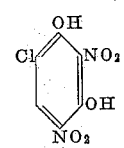

2,5-dichloro-4-nitrophenol, M.P. 117° C.

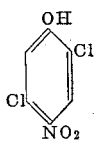

Of the above specific compounds, 2,5-dichloro-4-nitrophenol and 3,6-dichloro-2-nitrophenol are the presently preferred active ingredients in biologically active compositions of this invention, as a plant growth regulant as will be set forth in some detail hereinafter.

Generally, compounds of this invention may be prepared by nitration of a chlorinated phenol, chlorination of nitrophenols, or the like, the former procedure generally being preferred using nitric acid, a mixture of nitric acid and sulfuric acid or other nitrating agent. Thus, 2,5-dichloro-4-nitrophenol can be prepared by combining nitric acid and 2,5-dichlorophenol. Alternatively, a compound such as 2,4-dichloro-5-nitrophenol can be prepared by reacting 2,4-dichlorophenol with $POCl_3$, reacting the resulting product with nitric acid to introduce a nitro group in the 5 position and subsequently hydrolyzing this material in water to obtain the 2,4-dichloro-5-nitrophenol. Other chloronitrophenols can be prepared similarly.

The use of compositions of this invention is contemplated in formulating various plant growth regulating compositions such as fungicides, herbicides including pre- and post-emergent herbicides, both as soil additives and foliage sprays, nematocides and the like, as well as insecticides. In such applications, it generally is desirable to employ a compound of this invention in a minor amount as the essential active ingredient, e.g., about .01% to a larger amount dictated by economic considerations and the effect sought in application, but typically the active material seldom exceeds about 5% although in certain instances it can be as high as 49% by weight, and to utilize a major amount of a carrier, e.g., about 51 to 99.99% by weight. As used throughout the specification and claims, the term "carrier" is intended to include various materials, both liquid and/or solid, i.e., finely divided materials, and contemplates the use of such substances as extenders, diluents, solvents, fillers, conditioners, and the like. There also may be included, of course, where necessary, minor amounts of emulsifiers or other surface active agents when emulsions, suspensions or emulsifiable concentrates are desired. Illustrative carriers are liquids such as water and diverse organic solvents including various petroleum fractions, blends, and mixtures thereof, e.g., kerosene, acetone, alcohols, oils and the like, and finely-divided solids such as talc, clays, diatomaceous earth, spent catalyst, gels, soil or other substances.

In order that those skilled in the art may more completely understand the present invention and the preferred methods by which the same may be carried into effect, the following specific examples are offered:

EXAMPLE I

*Preparation of 2,5-Dichloro-4,6-Dinitrophenol*

PART A

To 40 gms. (0.245 mol) of 2,5-dichlorophenol dissolved in 125 ml. chloroform are added dropwise over a period of three hours, 65 ml. of 70% nitric acid. The resultant solution is cooled and 49 gm. of a yellow solid crystallizes out. This crude product is recrystallized from benzene and the thus-purified 2,5-dichloro-4,6-dinitrophenol melts at 146°–147° C.

PART B

Using the product of Part A as an insecticide, a percentage mortality, at a rate of 64 lbs./acre on plants against *Aphis fabae* is 91% as compared with an untreated test mortality value of 14%.

PART C

The product of Part A is evaluated as a fungicide and exhibits moderate activity in a spore germination test against the fungi *Alternaria oleracea* and *Monilina fructicola*. In a test involving application to tomato foliage, there is observed against early blight a 79% and 74% disease control, respectively, at concentrations of 2000 and 400 parts per million; against late blight at the same concentrations there is observed an 89% and 74% disease control, respectively.

PART D

In herbicidal tests, the product of Part A exhibits a moderate activity against radish and rye grass seed germination in Petri dishes and when applied to bean foliage as a spray in a concentration of 6400 parts per million.

PART E

In nematocidal tests, the product of Part A is applied to nematode-infested soil around tomato plants at a dosage of about 0.4 gm. per plant. There is observed some plant stunting but no phytotoxic effects, and a resultant infection rating of 3 compared to a rating of 4.3 for an untreated comparative sample. In a further test wherein the product of Part A is used as a contact nematocide against *Panagrellus redivivus* at a concentration of concentration of 1000 parts per million, there is observed a 100% nematode mortality as against an untreated check test value of .4% mortality.

EXAMPLE II

*Preparation of 6-Chloro-2,4-Dinitro-1,3-Resorcinol*

PART A

Into a 500 ml., 3-neck round bottom flask equipped with a stirrer, thermometer, reflux condenser and dropping funnel are introduced 54.0 gm. (0.2 mol) 2,4,5-trichloro-1,3-dinitrobenzene suspended in 50 ml. water. This mixture is warmed to 50° C. and 21 ml. of a 30% aqueous solution of NaOH is added and heating continued. At 100° C. another 21 ml. NaOH solution is introduced. The thus-formed mixture is then heated at 103–105° C. for 4 hours after which 2 more 21 ml. portions of the NaOH solution are added at half-hour intervals at 103–105° C. The heavy organic layer slowly changes to a finely-divided solid.

At the end of the heating period, the mixture is diluted with 25 ml. water, heated a few minutes more, and diluted with 50 ml. water and cooled with stirring. The reaction mixture is then filtered and the residue washed with cold water until the filtrate is orange-yellow. The wet filter cake is slurried in 75 ml. water and stirred into 25 ml. concentrated HCl and ice. The brownish-yellow precipitate is filtered off, washed with water and dried.

This material is then dissolved in 300 ml. boiling carbon tetrachloride, boiled with carbon, and the orange-yellow filtrate concentrated to about 200 ml. and allowed to stand and crystallize out. The thus-obtained 6-chloro-2,4-dinitro-1,3-resorcinol is washed with cold $CCl_4$, dried, and melts at 91–92° C.

PART B

The product of Part A when tested as a herbicide exhibits a high degree of activity when applied as a foliage spray. At a concentration of 6400 parts per million ratings of 11, 9, 3 and 5, respectively, are obtained against tomato, bean, corn and oats as against a zero rating for untreated plants.

Tests conducted via soil watering using the product of Part A in a concentration of 128 lbs. per acre yield phototoxicity values of 6 and 11, respectively, against tomato and bean plants in comparison with zero values obtained on untreated plants. A moderate activity also is observed against radish and rye grass seed germination in Petri dish tests.

PART C

Pre-emergent herbicidal tests are conducted by applying the product of Part A in a concentration of 64 lbs. per acre. The resultant percentage stand as compared to control is 50% re broadleaf and 75% re grass, with some stunting and chlorosis of the broadleaf noted.

PART D

In nematocidal tests, the product of Part A exhibits a 100% kill (24 hours) of *Panagrellus redivivus* when used as a contact nematocide in a concentration of 1000 p.p.m. in comparison with a check test mortality value of 4%.

EXAMPLE III

*Preparation of 2,5-Dichloro-4-Nitrophenol*

PART A

To 40 gm. (0.245 mol) of 2,5-dichlorophenol dissolved in 120 ml. chloroform are added 21 gm. 70% nitric acid dropwise over a half hour peroid during which period the reaction temperature rises to 50° C. The reaction mixture is then cooled to room temperature and a yellow solid crystallizes out. This solid is recrystallized from carbon tetrachloride and the thus-purified 2,5-dichloro-4-nitrophenol melts at 117° C.

PART B

The product of Part A is tested as an insecticide against several insects on plants at a concentration of 2000 p.p.m. The percentage insect mortality is as follows:

| Bean Beetle | Roach | Mite | Aphid |
|---|---|---|---|
| [1] 45 | 95 | 100 | 100 |

[1] Greater than 50% feeding inhibition.

PART C

In a fungicidal evaluation, the product of Part A, when employed in a spore germination inhibition test on glass slides against the fungi *Alternaria oleracea* and *Monilinia fructicola* exhibits a moderate degree of germination inhibition.

PART D

When tested as a herbicide, the product of Part A exhibits a high degree of activity in seed germination Petri dish tests against radish and rye grass seeds. In foliage spray tests at a concentration of 6400 parts per million a phytotoxicity rating of 11, representing a killing of the plant, is observed against tomato and bean foliage while corresponding values of 5 and 8, respectively, against corn and oats are noted. In tests wherein the product of Part A is applied at a rate of 128 lbs./acre to the soil via watering, a high degree of herbicidal action is observed, as evidenced by a rating of 11.

PART E

A further herbicidal test is conducted to demonstrate pre-emergent herbicidal activity using the product of Part A at a rate of 64 lbs./acre. The percentage stand of broadleaf and grass, respectively, compared to an untreated control, is 0 and 5, thus indicating a singularly high pre-emergent activity.

PART F

To demonstrate post-emergent herbicidal activity, the product of Part A is applied as a foliage spray against several plants with the results tabulated below:

| Concentration (p.p.m.) | Tomato | Bean | Corn | Oats |
|---|---|---|---|---|
| 3,200 | ¹11 | 11 | 11 | 11 |
| 1,600 | 11 | 11 | 11 | 11 |
| 800 | 11 | 11 | 11 | 10 |
| 800 | 11 | 11 | 5 | 5 |
| 400 | 11 | 11 | 3 | 5 |
| 200 | 3 | ²10 | 0 | 4 |
| Check (0) | 0 | 0 | 0 | 0 |

¹ 11 means plant killed.
² Defoliated.

PART G

In soil watering tests wherein the product of Part A is applied to the soil, the following herbicidal effects are observed:

| Dosage, lbs./acre | Tomato | Bean |
|---|---|---|
| 64 | ¹11 | 11 |
| 32 | 11 | 11 |
| 16 | 11 | 8 |
| 8 | 1 | 9 |
| 0 | 0 | 0 |

¹ 11 means plant killed.

PART H

In nematocidal testing, the product of Part A employed as a contact nematocide exhibits a 100% kill of *Panagrellus redivivus* after 24 hours, using a concentration of 1000 p.p.m. An untreated check test indicates a 3% mortality.

EXAMPLE IV

Using the procedure and rating system of the foregoing examples, 3,6-dichloro-2-nitrophenol exhibits biological activity as follows:

PART A.—EFFECTIVENESS AS INSECTICIDE

| Insect | Concentration (p.p.m.) | Mortality (percent) |
|---|---|---|
| Roach | 2,000 | 90 |
| Bean Aphid | 2,000 | 66 |
| Mite | 1,000 | 78 |

PART B.—EFFECTIVENESS AS FUNGICIDE

| Fungus | Concentration which affords disease control (p.p.m.) |
|---|---|
| A. oleracea | <10 |
| M. fructicola | <100 |

PART C

Pre-emergent herbicidal effectiveness is demonstrated by contacting lamb's-quarters and green foxtails plant seeds with 3,6-dichloro-2-nitrophenol. In this test a concentration of less than 100 p.p.m. prevents germination of more than half of each type seed.

PART D

In a foliage spray post-emergence evaluation 3,6-dichloro-2-nitrophenol at a concentration of 6400 p.p.m. receives phytotoxicity ratings, based on a scale from 0 for no plant injury to 11 for plant kill, of 11, 4, 1 and 1 for tomato, bean, corn and oat plants, respectively, thus demonstrating selective herbicidal activity.

PART E 3,6-dichloro-2-nitrophenol kills both tomato and bean plants when about 50 mls. of a 2000 p.p.m. aqueous formulation of the compound is applied to the soil around the plants.

PART F

Pre-emergent herbicidal activity is also demonstrated by applying 3,6-dichloro-2-nitrophenol at a concentration equivalent to 16 lbs./acre to a mixture of seed of representative broadleaf plants and grass plants. After two weeks, greater than 60% of the grass seeds emerge whereas none of the broadleaf seeds emerge.

PART G

The compound of Part A of this example is 100% effective against nematodes, i.e., *Panagrellus redivivus*, both as a contact and fumigant poison.

EXAMPLE V

The effectiveness of 2,4-dichloro-5-nitrophenol as a biologically active compound is demonstrated employing the foregoing procedures and rating systems except when modified as indicated hereinafter.

PART A 2,4-dichloro-5-nitrophenol kills greater than 75% of bean aphid when applied systemically to the soil around nasturtium plants in a 2000 p.p.m. aqueous formulation.

PART B

In a similar insecticide test, the compound of this example causes greater than 50% mite and bean aphid mortality when sprayed on the foliage of the test plants.

PART C 2,4-dichloro-5-nitrophenol inhibits the germination of greater than 50% of both *A. oleracea* and *M. fructicola* when applied at a concentration of less than 10 p.p.m.

PART D

Systemic fungicidal activity is also demonstrated by applying 2,4-dichloro-5-nitrophenol at a rate of 64 lbs./acre to soil infested with seed decay and damping off fungi. Greater than 60% of planted pea seeds emerge whereas none of the plants emerge in a standard check plot.

PART E

Bactericidal activity of both (1) 2,4-dichloro-5-nitrophenol and (2) 3,6-dichloro-2-nitrophenol at a concentration of 100 p.p.m. is shown by the following table:

| Compound | Bacteria Control in percent growth | | | |
|---|---|---|---|---|
| | E. amylovora | X. phaseoli | S. aureus | E. coli |
| (1) | 100 | 0 | 100 | 50 |
| (2) | 50 | 0 | 0 | 0 |
| Check | 100 | 10 | 100 | 100 |

PART F

A concentration of 10 to 100 p.p.m. 2,4-dichloro-5-nitrophenol will cause less than 50% of both plantain and rye grass seeds to germinate thus demonstrating herbicidal activity.

PART G 2,4-dichloro-5-nitrophenol kills tomato, corn and bean plants when sprayed on the foliate of these plants, whereas oat plants similarly treated receive a phytotoxicity rating of 4, thus demonstrating selective herbicidal activity.

PART H

The compound of this example also kills tomato and bean plants when applied to the soil around the plants at a concentration of less than 64 lbs./acre.

PART I 2,4-dichloro-5-nitrophenol causes 100% nematode mortality against the *Panagrellus redivivus* as a contact poison.

EXAMPLE VI

To demonstrate the singular effectiveness of compositions of this invention, e.g., polychloronitrophenols such as polychloro-, mono- and dinitrotrichlorophenols, when used in the control of lamprey, experiments are conducted using 2,5-dichloro-4-nitrophenol as a lampricide in accordance with the following procedure.

Into 8 liter glass battery jars each containing 5 liters of water, aerated via stone-air beakers and maintained at constant temperature, are introduced 2,5-dichloro-4-nitrophenol in acetone solution at different concentrations 5 hours before specimens are placed in the jars, the temperature initially being maintained at 55° F.

Into the thus-prepared jars are introduced as specimens (1) larvae of the sea lamprey (*Petromyzon marinus*) and two species of fish, i.e., (2) rainbow trout (*Salmo gairdnerii*) and (3) bluegill sunfish (*Lepomis macrochirus*) of a fingerling size (4 inches or less). Two specimens of each of the three specimens are used. Observations are made six times during a 24-hour period following introduction of the specimens to determine the toxic effect of the 2,5-dichloro-4-nitrophenol.

As a result of such tests at varying temperatures, it is found that concentrations of 2,5-dichloro-4-nitrophenol as low as 3 to 12 p.p.m. exhibit a singularly high killing of the lamprey larvae while not harming the fish specimens. Hence, it will be appreciated that 2,5-dichloro-4-nitrophenol not only is highly effective as a lampricide but also selective in its action.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of killing nematodes which comprises contacting said nematodes with a nematocidal dosage of a compound of the structure

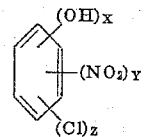

wherein X is a number from 1 to 2, inclusive, Y is a number from 1 to 2, inclusive, and Z is a number from $1$ to $6-X-Y$, inclusive.

2. The method of killing bacteria which comprises contacting said bacteria with a bactericidal dosage of a compound of the structure

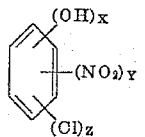

wherein X is a number from 1 to 2, inclusive, Y is a number from 1 to 2, inclusive, and Z is a number from 1 to $6-X-Y$, inclusive.

References Cited in the file of this patent

UNITED STATES PATENTS

| | | |
|---|---|---|
| 2,841,485 | Johnson | July 1, 1958 |
| 2,843,470 | Searle | July 15, 1958 |
| 2,850,537 | Stoesser et al. | Sept. 2, 1958 |
| 2,922,741 | Urbschat | Jan. 26, 1960 |
| 2,923,657 | Dost | Feb. 2, 1960 |

OTHER REFERENCES

Fries et al.: Chem. Abst., vol. 21, p. 2692, 1927.
Groves et al.: Chem. Abst., vol. 23, p. 2957, 1929.
Frear: A Catalogue of Insecticides and Fungicides, vol. 1, pp. 38, 43; vol. 2, p. 26, 1947.
King: Chemicals Evaluated as Insecticides, U.S. Dept. Agr. Handbook No. 69, p. 260, May 1954.
Bradbury et al.: Chem. Abst., vol. 48, p. 10285g, 1954.